Nov. 22, 1966 MINORU WADA 3,287,594

HORIZONTAL DEFLECTION DEVICE

Filed June 25, 1963

INVENTOR
Minoru Wada

BY Hill, Sherman, Meroni, Gross & Simpson
ATTORNEY

United States Patent Office 3,287,594

Patented Nov. 22, 1966

3,287,594
HORIZONTAL DEFLECTION DEVICE

Minoru Wada, Kawasaki, Japan, assignor to Nippon Columbia Kabushikikaisha (Nippon Columbia Co., Ltd.), Kawasaki, Japan, a corporation of Japan Filed June 25, 1963, Ser. No. 290,487
Claims priority, application Japan, July 9, 1962, 37/28,849
3 Claims. (Cl. 315—27)

This invention relates to a horizontal deflection device of television receivers and more particularly to a horizontal deflection device in which two diodes connected to different terminals of a horizontal deflection output transformer and a boost capacitor are provided and large deflection reactive power is taken out from a low power source voltage.

One object of this invention is to provide a horizontal deflection circuit in which large deflection reactive power may be taken out.

Another object of this invention is to provide a horizontal deflection circuit in which a predetermined deflection reactive power may be held substantially constant irrespective of the variation of a load.

A further object of this invention is to provide a horizontal deflection circuit in which horizontal deflection output transistors may effectively be protected.

Other objects, features and advantages of this invention will become apparent from the following description taken in conjunction with the accompanying drawings, in which.

Figure 1:
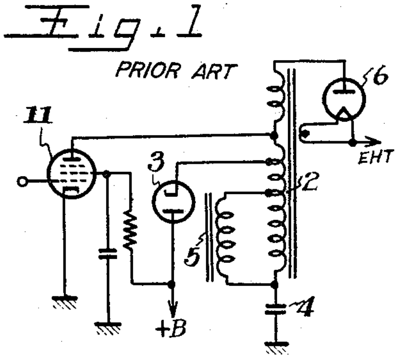
FIGURE 1 is a connection diagram showing a conventional horizontal deflection circuit using vacuum tubes.

Referring to FIGURE 1, a horizontal deflection circuit heretofore employed will be explained. 11 is a horizontal deflection output tube, 2 a horizontal deflection output transformer, 3 a damper diode, 4 a boost capacitor, 5 a horizontal deflection coil and 6 a rectifier tube for extra high voltage supply.

In such a horizontal deflection circuit, the boost capacitor 4 is discharged through the output tube 11 during the latter half cycle of a horizontal scanning voltage and charged through the damper 3 during the first half cycle thereof, therefore the electric charges of the charging and discharging must be equal to each other in order for the boost capacitor 4 to hold a constant charging voltage. According to this condition the position of the tap of the output transformer for the diode to be connected to is determined, for example in the case of 110° deflection, the number of turns from the diode 3 to the boost capacitor 4 is 70% or so of that from the output tube to the boost capacitor.

In this circuit the charging voltage of the boost capacitor 4 is held substantially constant, but the charging quantity varies with the variation of, for example, a high voltage load, consequently the charging voltage varies to some extent and its deflection current also varies correspondingly.

The circuit shown in FIGURE 1 may also be applied to a horizontal deflection circuit using a transistor, but in the case of using a transistor its loss is generally small on account of its small internal resistance and the turns ratio from a damper diode to a boost capacitor and from an output transistor to the boost capacitor becomes larger than that in the case of using a vacuum tube. Therefore all the inductance of the circuit is large and a pulse voltage during retrace becomes considerably high to break down the output transistor.

Figure 2:
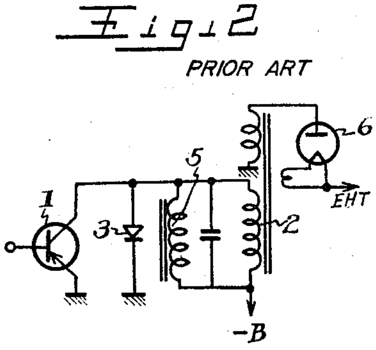
FIGURE 2 is a circuit diagram of a conventional deflection circuit using a transistor.

To avoid this, it is usual in a deflection circuit using a transistor to connect a transistor 1 and the damper diode 3 to one end of the primary coil of an output transformer 2 as illustrated in FIGURE 2 (circuit elements corresponding to those in FIGURE 1 being marked with the same numeral references). In this case the boost capacitor 4 in FIGURE 1 is not employed. Referring to the deflection circuit in FIGURE 2, an example of a deflection circuit for effecting 14 inch-90 degree deflection will hereinbelow be explained. When a power source voltage —B is —12 v., the inductance of a deflection coil 5 is 50$\mu$ h. (50 microhenries), the peak-to-peak value of a saw tooth current is 12.5 a. and the deflection reactive output becomes to be 8 mh.·a.$^2$ (8 millihenries·ampere$^2$). According to this circuit, the power source is discharged through the output transistor during the latter half cycle of a scanning voltage and charged through the diode 3 during the first half cycle of the scanning voltage. In this case the quantity of the charging current is much less than the discharging current, so that the current of about 600 ma. flows from the power source as an average current in this example and the peak value of the collector current of the output transistor is about 7.5 A.

In this circuit, when obtaining the same deflection reactive power of 8 mh.·a.$^2$ (8 millihenries·ampere$^2$) as that in the above example by a power source voltage of —6 v., the peak value of the collector current must be 10.5 a. which is $\sqrt{2}$ times larger than that of 7.5 a. in the above example. In the case of 114 degree deflection the deflection reactive power is required to be about two times larger than that in the case of 90 degree deflection, and hence if the power source voltage is —12 v., the peak value of the collector current is also required to be 10.5 a. However, transistors which flow such large peak value current are expensive and not practicable. Furthermore, two transistors are difficult to use in parallel from a viewpoint of balancing.

According to this invention, the above disadvantage may be removed and the deflection reactive power may be obtained with a low power source voltage and a small collector current. One example of this invention in FIGURE 3 will hereinafter be explained with reference to the drawings.

An output transistor 1, a horizontal deflection output transformer 2, a damper diode 3, a horizontal deflection coil 5 and a rectifier tube 6 for extra high tension power supply are circuit elements respectively corresponding to those in FIGURE 2, and a boost capacitor 4 is connected between one end of the transformer 2 and the ground.

In this invention, a diode 7 other than the damper diode 3 is connected between a desired mid-point, which may preferably be the neutral point of the transformer 2, and a power source —B. Here, the damper diode 3 is called an efficiency diode after its operation and the diode 7 is referred to as a boost diode due to its operation.

For a better understanding of this invention, an example of 14-inch 90 degree deflection which is the same as that in FIGURE 2 will hereinafter be explained.

Figure 4:
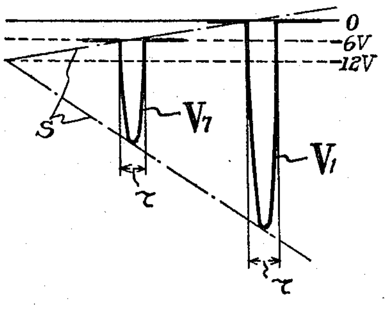
FIGURE 4 is a wave form diagram with its time axis shown diverging to permit illustration of simultaneously produced voltages, for explaining the circuit shown in FIGURE 3.

When the pwer source voltage —B is —6 v., if the connection point of the boost diode 7 is connected exactly to the center between the output transistor 1 and the boost capacitor 4 of the horizontal output transformer, voltage wave forms of the respective portions of the circuit become as illustrated in FIGURE 4. That is, in FIGURE 4, $V_1$ shows a collector voltage with respect to the ground of the horizontal deflection output transistor 1 and $V_7$ shows a plate voltage of the boost diode 7. Although the two voltages $V_1$ and $V_7$ are produced simultaneously, they are shown separately on the abscissa for the convenience's sake. $\tau$ is a retrace time. Thus, in this example, the relationship in the amount of the two voltages is that $V_1:V_7=2:1$, as is apparent from the divergent time axis graph S. In this case, the voltage across the terminal of the boost capacitor 4 is −12 v., and the peak value of the collector current is 7.5 A. and the deflection reactive power becomes 8 mh.·a.$^2$ (8 millihenries·ampere$^2$) similarly to the case in FIGURE 2. The reason is as follows:

If the charging voltage of the boost capacitor 4 becomes larger in the negative direction than −12 v. by some cause, the plate voltage of the boost diode 7 also becomes larger in the negative direction than the power source voltage, as a result no current will pass through the diode 7 and the discharge of the boost capacitor 4 through the output transistor 1 exceeds the charge through the efficiency diode 3 and then the charging voltage goes down to −12 v. On the other hand, when the charging voltage becomes smaller in the negative direction than −12 v., the plate voltage of the boost diode 7 becomes higher than the power source voltage through one horizontal scanning period and a larger amount of current charges the boost capacitor 4 through the diode 7 up to −12 v.

Thus, the boost diode 7 is connected selectively to a suitable tap of the horizontal output transformer in response to the voltage of the power source connected to the diode 7, and the position of the tap may be selected for a considerably wide range of the winding of the horizontal output transformer, so that it is not restricted to one point as in the circuit of FIGURE 1. Furthermore, the charging electric voltage of the boost capacitor 4 never varies with the variation of a high voltage load, and hence the deflection current is always substantially constant.

Figure 5:
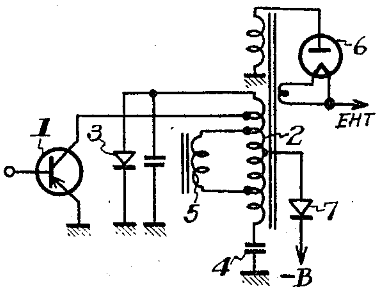
FIGURE 5 is a connection diagram illustrating another example of this invention.

The circuit illustrated in FIGURE 5 is another embodiment of this invention, in which the connection of an efficiency diode 3 is changed so as to decrease the distortion of the deflection current due to the internal resistance of the diode 3, and the deflection coil is connected to a suitable tap of an output transformer in order to match the circuit. Namely, the plate of the damper diode 3 is connected to one outer terminal of the transformer 2 and the cathode thereof is grounded. The collector of the transistor 1 is connected to a tap of the transformer 2 and both terminals of the coil 5 are connected respectively to two inner taps. The plate of the boost diode 7, in this case, is connected to an intermediate tap of the transformer between the two inner taps to which the coil 5 is connected.

According to this invention as described above, large deflection reactive power may be supplied with a low power source voltage by utilizing two diodes connected to different terminals of a horizontal output transformer and a boost capacitor.

Figure 3:
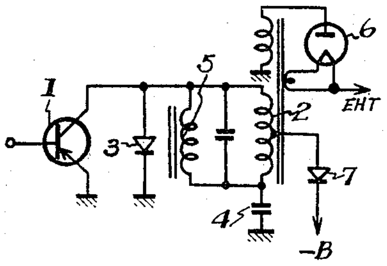
FIGURE 3 is a connection diagram of a horizontal deflection circuit according to this invention.

This invention has been described with reference to two examples thereof shown in FIGURES 3 and 5, but even if other modifications will be made, for example the type of the transistor 1 is changed and the polarity of the power source is altered accordingly, or a vacuum tube is employed, the effects of this invention described in the foregoing may similarly be obtained.

It will be apparent that many modifications and variations may be effected without departing from the scope of the novel concept of this invention.

What is claimed is:

1. A horizontal deflection device comprising a horizontal deflection transformer having a primary winding, a capacitor connected between one end of said primary winding and a reference potential, an amplifier including a transistor having a base electrode, an emitter electrode, and a collector electrode, with a pair of said electrodes forming an input and another pair of said electrodes forming an output, with one of said electrodes being common to both the input and the output, the output of said amplifier being connected across said primary winding and said capacitor, a horizontal deflection coil connected to said transformer, a damper diode connected in parallel with the output of said amplifier, a source of potential, and a boost diode connected between one electrode of said transistor which forms part of the output thereof and said source of potential for boosting the voltage across said capacitor.

2. A horizonal deflection device comprising a horizontal deflection transformer having a primary winding, a capacitor connected between one end of said primary winding and a reference potential, an amplifier including a transistor having a base electrode, an emitter electrode, and a collector electrode, with a pair of said electrodes forming an input and another pair of said electrodes forming an output, with one of said electrodes being common to both the input and the output, the output of said amplifier being connected across said primary winding and said capacitor, a horizontal deflection coil connected to said transformer, a damper diode connected in parallel with the output of said amplifier, a source of potential, and a boost diode having an anode connected to a mid-point of said primary winding and having a cathode connected to said source of potential.

3. A horizontal deflection device comprising a horizontal deflection transformer having a primary winding, a capacitor connected between one end of said primary winding and a reference potential, an amplifier including a transistor having a base electrode, an emitter electrode, and a collector electrode, with a pair of said electrodes forming an input and another pair of said electrodes forming an output, with one of said electrodes being common to both the input and the output, one electrode of said transistor which forms part of the output thereof being connected to the reference potential and the other electrode which forms part of the output thereof being connected to a tap of said primary winding, a horizontal deflection coil connected to said transformer, a damper diode connected across said primary winding and said capacitor, a source of potential, and a boost diode having an anode connected to another tap of said primary winding and having a cathode connected to said source of potential.

References Cited by the Examiner

FOREIGN PATENTS 1,316,762 12/1962 France.

DAVID G. REDINBAUGH, *Primary Examiner.*

T. A. GALLAGHER, *Assistant Examiner.*